(12) United States Patent
Belchee et al.

(10) Patent No.: US 9,037,714 B2
(45) Date of Patent: May 19, 2015

(54) CROSS-PLATFORM APPLICATION MANAGER

(75) Inventors: William Blake Belchee, Charlotte, NC (US); Julie M. Ingalls, Newark, DE (US); Richard A. McEntee, Charlotte, NC (US); K Kanaka Subramaniam, Chennai (IN); Jogeswar Sarma Malapaka, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 379 days.

(21) Appl. No.: 13/215,977

(22) Filed: Aug. 23, 2011

(65) Prior Publication Data
US 2013/0054801 A1 Feb. 28, 2013

(51) Int. Cl.
*G06F 15/173* (2006.01)
*G06F 15/16* (2006.01)
*G06F 21/10* (2013.01)

(52) U.S. Cl.
CPC .................................... *G06F 21/105* (2013.01)

(58) Field of Classification Search
CPC ... H04L 29/06; H04L 29/14; H04L 29/12481; H04L 47/11; H04L 47/20; H04L 67/02; H04L 67/10; H04L 67/025; H04L 67/34; H04L 67/141; H04L 67/145; H04L 67/2814; H04L 67/2823; H04L 69/18; H04L 69/22; G06F 21/41; G06F 21/53; G06F 21/70; G06F 21/105; G06F 21/575

USPC ......................... 709/203, 221, 223, 225, 228
See application file for complete search history.

(56) References Cited

U.S. PATENT DOCUMENTS

| | | | |
|---|---|---|---|
| 5,195,819 A * | 3/1993 | Chaut et al. | 362/253 |
| 7,334,258 B1 | 2/2008 | Ford et al. | |
| 8,108,536 B1 * | 1/2012 | Hernacki et al. | 709/231 |
| 8,161,299 B2 * | 4/2012 | Karkaria et al. | 713/300 |
| 8,392,973 B2 * | 3/2013 | Bank et al. | 726/5 |
| 2005/0097310 A1 * | 5/2005 | Chu et al. | 713/2 |
| 2009/0052440 A1 * | 2/2009 | Pfeffer et al. | 370/352 |
| 2009/0164772 A1 * | 6/2009 | Karkaria et al. | 713/100 |
| 2009/0300122 A1 * | 12/2009 | Freer | 709/206 |
| 2010/0251265 A1 * | 9/2010 | Hodson et al. | 719/319 |
| 2012/0036199 A1 * | 2/2012 | Slee et al. | 709/206 |
| 2012/0173897 A1 * | 7/2012 | Karkaria et al. | 713/300 |

* cited by examiner

*Primary Examiner* — Emmanuel L Moise
*Assistant Examiner* — Farzana Huq
(74) *Attorney, Agent, or Firm* — Banner & Witcoff, Ltd.; Michael A. Springs

(57) ABSTRACT

An application manager may distribute applications from trusted servers to end-user devices. The end-user devices, such as mobile devices managed by the application manager, may include devices having different platforms. An application manager may determine whether one or more application servers are trusted servers before determining whether applications may be provided from the application servers. Both internal servers and certain external servers may be trusted application servers when particular criteria are satisfied. An application manager may also manage application licenses for one or more end-user devices.

20 Claims, 11 Drawing Sheets

CROSS-PLATFORM APPLICATION MANAGER

TECHNICAL FIELD

One or more aspects of the disclosure generally relate to servers, computing devices, computing systems, and computer software. In particular, one or more aspects of the disclosure generally relate to servers, computing devices, computing systems, and computer software that may be used by an entity to provide an application manager that manages and distributes applications from servers to devices.

BACKGROUND

Application stores sell and distribute software applications to end-user devices. Users may browse, purchase and download applications from these application stores. Applications may include, for example, mobile applications downloadable by mobile devices. As distribution of applications becomes more and more popular, it may be desirable to develop and implement more trustworthy, convenient, responsive, dynamic, automatic, and customizable ways of managing distribution of applications.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Certain aspects of this disclosure relate to an application manager. According to one or more aspects, an application manager may be stored on a management server and distribute one or more applications from one or more servers to one or more devices. An application manager may also determine whether one or more servers is trusted and provide applications to one or more devices from one or more trusted servers. An application manager may determine that an internal server is trusted and subsequently store information identifying the internal server as trusted. An application manager may also determine whether or not an external server is trusted. In one or more aspects, a trusted external server may be one or more of a previously trusted server, a server listed on a predetermined list of trusted servers, a server managed by an entity that manages the application manager, or a server indicated as trusted by an administrator associated with the application manager. An application manager may subsequently store information identifying the external server as trusted.

According to one or more additional aspects, an application manager may provide applications to devices having different platforms. An application manager may receive a request for an application from one device, and in response to the request, provide a requested application to another device. According to one or more additional aspects, the application manager may receive first user preferences for a first application. Subsequently, the application manager may receive a request for the first user preferences and transmit the request. According to one or more additional aspects, the application manager may store license information for an application from a device. Subsequently, in response to determining that an application may be installed on more than one device, the application manager may provide an application to another device.

According to one or more additional aspects, an application manager may store information identifying a first group of users or devices and a second group of users or devices, the second group of users or devices being different from the first group of users or devices. Subsequently, an application manager may allow providing an application to the first group of users or devices but not the second group. In a further aspect, an application manager may provide a user or device management access to the application manager. Subsequently, the application manager may receive from the device or user provided management access, information identifying a first group of users or devices and a second group of users or devices.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
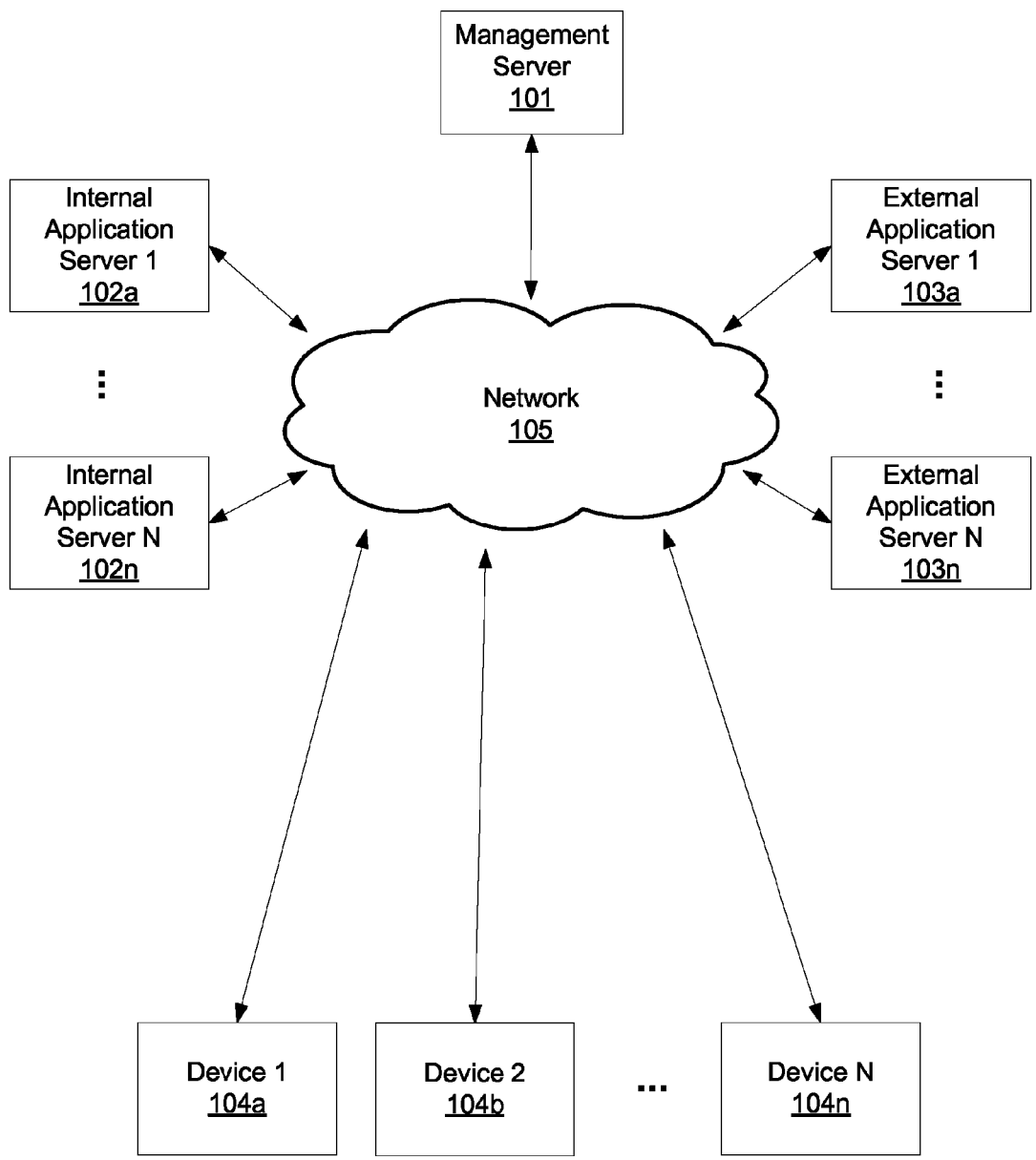
FIG. 1 illustrates an example network environment in which various aspects of the disclosure may be implemented.

FIG. 1 illustrates an example of a network environment 100 that may be used according to one or more illustrative embodiments. The network environment 100 is only one example of a suitable network environment and is not intended to suggest any limitation as to the scope of use or functionality contained in the disclosure. The network environment 100 should not be interpreted as having any dependency or requirement relating to any one or combination of components shown in the illustrative network environment 100.

One or more embodiments described herein may be operational with numerous other network environments or configurations. Examples of network environments or configurations include, but are not limited to, a local-area network (LAN), a wireless local-area network (WLAN), a wide area network (WAN), a metropolitan area network (MAN), a storage area network (SAN), a personal area network (PAN), a campus area network (CAN), a digital subscriber line (DSL) network, a frame relay network, an asynchronous transfer mode (ATM) network, a virtual private network (VPN), the internet, an intranet, a cellular network, a satellite network, a public switched telephone network (PSTN) and/or other network environments or configurations or combinations thereof.

Generally, a network environment includes a collection of systems, environments, devices and/or configurations interconnected by communications channels. Examples of systems, environments, devices and/or configurations that may be suitable for use with the disclosed embodiments include, but are not limited to, personal computers (PCs), server computers, hand-held or laptop devices, mobile devices, smartphone devices, tablet computers, multiprocessor systems, microprocessor-based systems, set top boxes, programmable consumer electronics, network PCs, minicomputers, mainframe computers, distributed computing environments that include any of the above systems or devices, and the like.

Communications channels may include one or more communication media. Examples of communications media that may be suitable for use with the disclosed embodiments include, but are not limited to, wired media, wireless media, optical media, and/or other media. Communications channels may also include one or more communications protocols. Examples of communications protocols that may be suitable for use with the disclosed embodiments include, but are not limited to, Ethernet, TCP/IP, UDP, FTP, HTTP, HTTPS, IEEE 802.11b/g/a/n, Bluetooth, CDMA, TDMA, GSM and/or other protocols.

With reference to FIG. 1, the network environment 100 may include a management server 101 on which one or more of the processes discussed herein may be implemented. Network environment 100 may also include any number of internal application servers 102a-n and external application servers 103a-n. The management server 101 may be wholly separate from the internal and external servers or may be implemented wholly or partially in any number of internal and external servers. For example, the management server 101 may be the same server as an internal application server 102a. Similarly, the management server 101 and an internal application server 102a may be owned, managed and/or operated by the same entity. Internal application servers 102a-n and external application servers 103a-n may be distinguished by one or more features. For example, internal servers 102a-n may be located at physical locations different from external servers 103a-n, including, but not limited to, different buildings and different server housings. Alternatively, internal servers 102a-n may be owned, managed and/or operated by a different entity or entities from external servers 103a-n. For example, internal servers 102a-n may be managed by one business entity, and external servers 103a-n may be managed by another business entity. Alternatively, internal servers 102a-n and external servers 103a-n may be characterized as such by an administrator of an application manager, as disclosed in further detail in the examples below. The internal and external servers, however, need not be distinguished as previously described, e.g. by physical location, entity, or administrator categorization, but may be distinguished by any number of one or more other features.

Internal servers 102a-n and external servers 103a-n may be similar in one or more regards. For example, the internal and external servers may be located within the same hardware structure. The hardware structure may be, for example, a network of servers. In this example, an internal server 102a may be one server located in the network of servers, and an external server 103a may be a different server located in the same network of servers. Alternatively, the hardware structure may be a server instead of a network of servers. In this example, an internal server 102a may be located in one partition of the server, and the external server 103a may be located in another partition of the server. In addition to being a server, the hardware structure may be any type of computer storage media. Computer storage media include, without limitation, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store data and/or applications. In this example, an internal server 102a may, for example, be located in one partition of the computer storage media, and the external server 103a may, for example, be located in another partition of the computer storage media.

The internal servers 102a-n and external servers 103a-n may also be located within the same server or computer storage media partition, but may be distinguished by the data or applications stored by each of the internal and external servers. For example, an internal server 102a may store a first application, and an external server 103a may store a second application. This distinction between internal and external servers will become more apparent in the description of FIG. 3, which shows an example method of registering an application server, according to one or more illustrative aspects of the disclosure.

The network environment 100 may include one or more devices 104a-n. The devices may be any of the previously described examples of systems, environments, devices and/or configurations (e.g. PCs, mobile devices, and the like) or any other computing device. The devices 104a-n may download, install, and/or use applications provided by the one or more internal application servers 102a-n, external application servers 103a-n, and/or management server 101. The various servers and devices may communicate using one or more communication channels provided by the network 105, the network including any of the networks, communication media and communication protocols previously described. Furthermore, the servers and devices may communicate using more than one network and need not communicate using the same network. For example, device 104a may be connected to device 104b through a first network, such as a network implementing Bluetooth, and device 104b may further be connected to internal server 102a through a second network, such as a cellular network.

Figure 2:
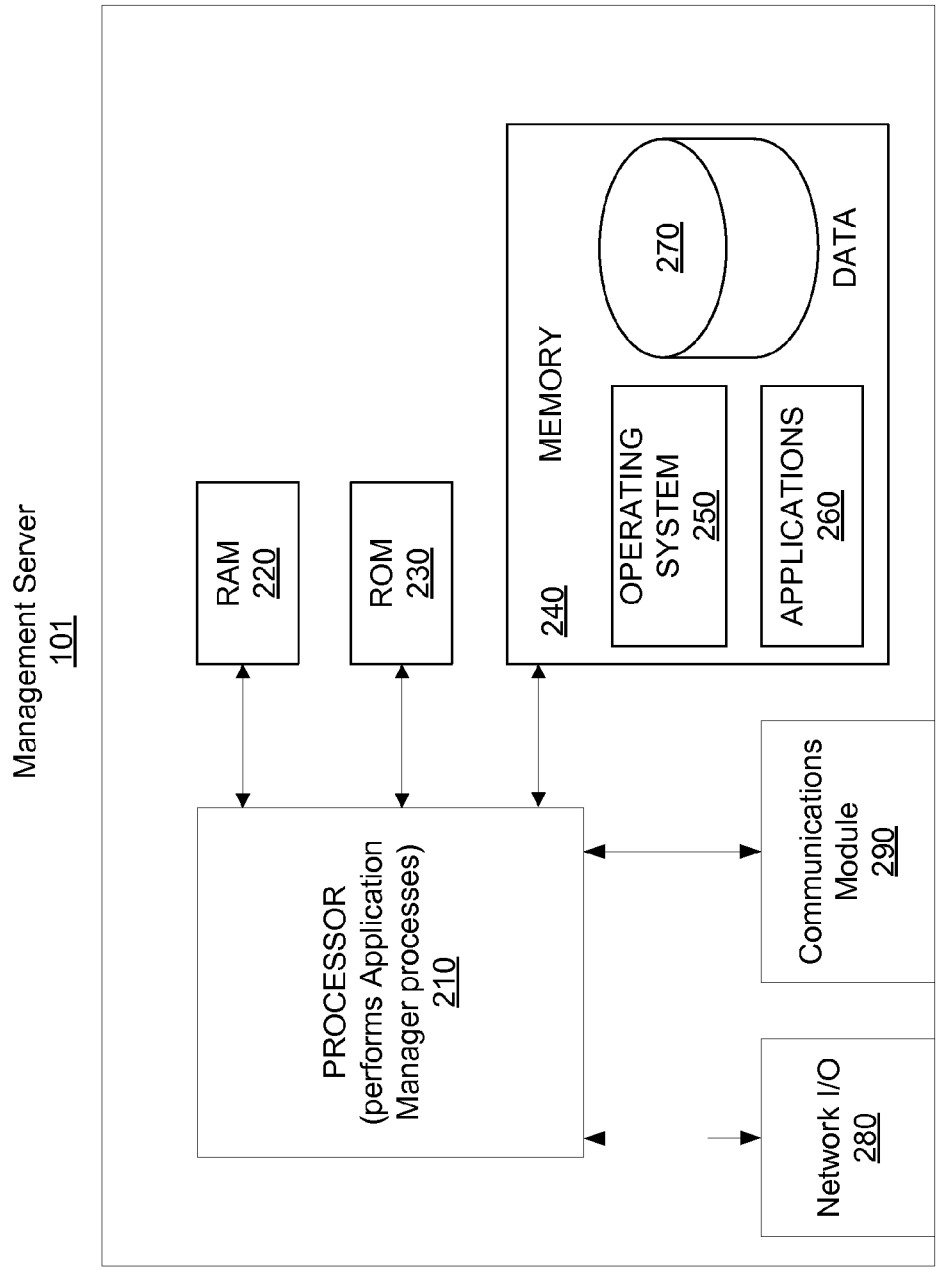
FIG. 2 illustrates an example management server which may implement one or more aspects of the disclosure.

FIG. 2 illustrates an example management server 101 which may implement one or more aspects of the disclosure. The management server 101 may have a processor 210 for controlling overall operation of the management server 101 and its associated components, including random-access memory (RAM) 220, read-only memory (ROM) 230, memory 240, Network I/O 280, and Communications Module 290. Management server 101 typically includes a variety of computer readable media. Computer readable media may be any available media that may be accessed by management server 101 and may include any of the previously listed computer readable media (e.g. RAM, ROM, EEPROM, and the like). Furthermore, by way of example, and not limitation, computer readable media may comprise a combination of computer storage media and communication media.

Communication media may embody computer readable instructions, data structures, program modules or other data in a modulated data signal such as a carrier wave or other transport mechanism and includes any information delivery media. A modulated data signal may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media.

Although not shown, RAM 220 may represent application data stored in RAM while the management server 101 is on and corresponding software applications (e.g., software tasks) are running on the management server 101.

Communications module 290 may include a microphone, keypad, touch screen, and/or stylus through which a user of computing device 101 may provide input, and may also include one or more of a speaker for providing audio output and a video display device for providing textual, audiovisual, and/or graphical output.

Software may be stored within memory 240 and/or storage to provide instructions to processor 210 for enabling management server 101 to perform various functions. For example, memory 240 may store software used by the management server 101, such as an operating system 250, application programs 260, and an associated database 270. Also, some or all of the computer executable instructions for management server 101 may be embodied in hardware or firmware. Similarly, applications to be provided to any of devices 104a-n may be stored in RAM 220, ROM 230, and/or memory 240 of the management server 101.

As previously described, management server 101 may operate in a networked environment supporting connections to one or more internal servers 102a-n, external servers 103a-n, and/or devices 104a-n. Network I/O 280 may include any software function or hardware device that facilitates communication between management server 101 and one or more of the internal servers, external servers and/or devices. The internal servers 102a-n, external servers 103a-n, and devices 104a-n may include some or all of the same software and hardware elements found in management server 101.

Embodiments described herein may include forms of computer-readable media. Computer-readable media may include any available media that can be accessed by a management server 101. Computer-readable media may comprise storage media and communication media and in some examples may be non-transitory. Storage media may include volatile and nonvolatile, removable and non-removable media implemented in any method or technology for storage of information such as computer-readable instructions, object code, data structures, program modules, or other data. Communication media may include any information delivery media and typically may embody data in a modulated data signal such as a carrier wave or other transport mechanism.

Various aspects described herein may be embodied as a method, a data processing system, and/or as a computer-readable medium storing computer-executable instructions. For example, a computer-readable medium storing instructions to cause a processor to perform steps of a method in accordance with aspects of the disclosed embodiments is contemplated. In one or more arrangements, aspects of the method steps disclosed herein may be executed on processor 210 on a management server 101. Such a processor may execute computer-executable instructions stored on a computer-readable medium.

The steps described in the following discussion and/or illustrated in the accompanying figures may be implemented by one or more of the components in FIGS. 1 and 2 and/or other components, including other computing devices.

Applications may include any type of application that may run on a computer, including, but not limited to, enterprise applications, enterprise infrastructure software, mobile applications, consumer applications, application suites, content access applications, content creation applications, simulation software, engineering software, social network applications, educational software, and other types of software. Further, an application manager may function as an application store. For example, one or more devices or users may be able to purchase applications from the application manager. Other application distributors and/or developers may also be able to share in revenue or profits collected from applications sales by the application manager.

Figure 3:
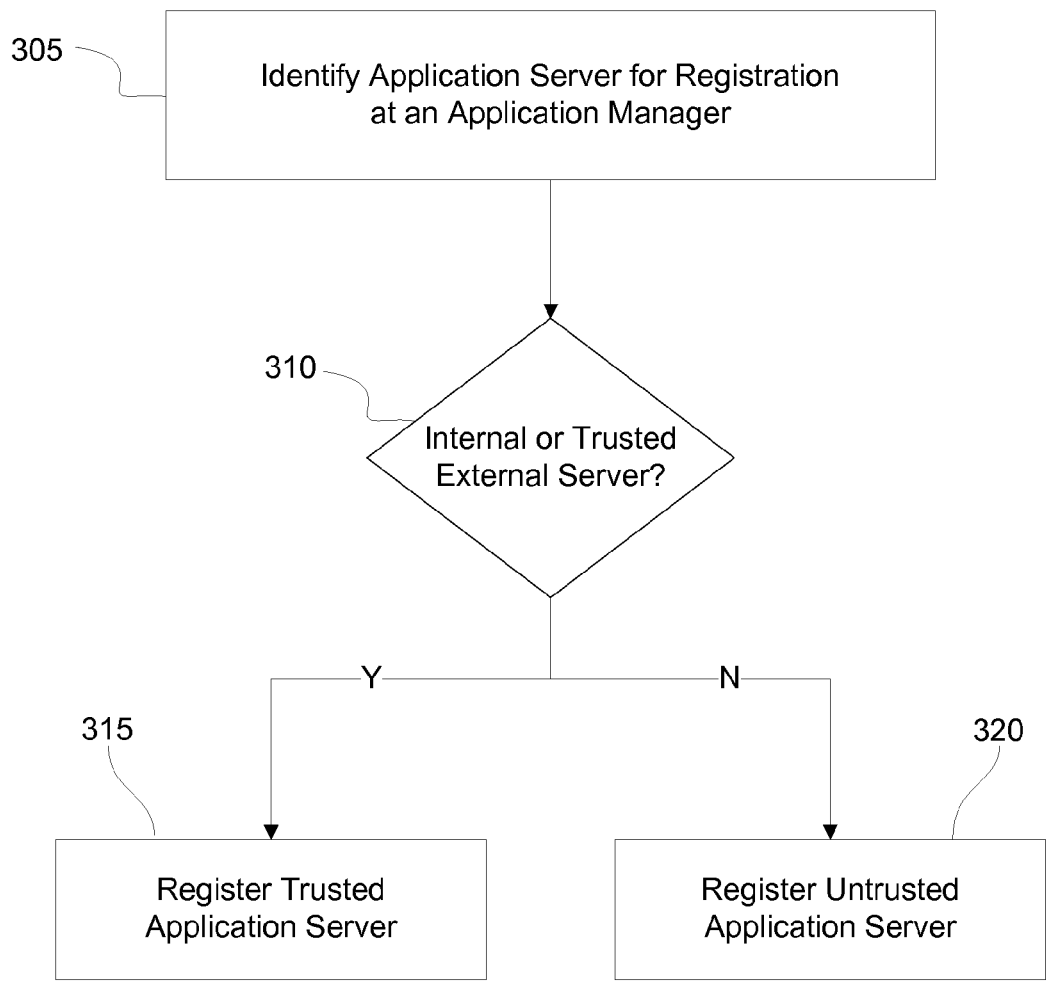
FIG. 3 is a flow diagram illustrating a method of registering an application server, according to one or more aspects of the disclosure.

FIG. 3 is a flow diagram illustrating a method of registering an application server, according to one or more aspects of the disclosure. In one or more arrangements, any and/or all of the steps of the example methods described herein may be performed by a computing device (e.g., management server 101), performed by a plurality of computing devices operating as a computing system (e.g., network 100), and/or embodied as computer-executable instructions stored on a non-transitory computer-readable medium (e.g., a hard disk, a removable disk, memory 240, and the like). The steps also may be rearranged into other orders, additional steps may be added, and/or one or more steps may be removed.

In step 305, an application manager 101 (e.g., an application manager process executing on management server 101) may identify one or more application servers, such as an internal application server 102a-n or external application server 103a-n to be registered with the application manager. In certain examples, the application manager may receive a request to register an application server. The request may, for example, originate from a server. For example, the application manager 101 may receive a request to register an application server when the server is connected to the network 105, when an application managing a server attempts to register the application server, or when a user inputs, through a server, a command causing the application server to attempt to register with the application manager 101. An application managing a server may be located in the server it manages or at a location remote from the server. If a request to register an application server has been received, the application manager may determine whether the application server is an internal server or a trusted server at step 310, as disclosed in further detail in the examples below.

Instead of receiving a request to register an application server, the application manager 101 may transmit a request to register a server or multiple servers. For example, when the application manager 101 detects that a server has connected to the network 105, the application manager may transmit a request to register the detected server. A connected server may, for example, be a device that is discovered upon connection to the network environment 100. The application manager 101 need not transmit the request upon detection of a server, but may transmit a request at any time. For example, the application manager may periodically transmit requests to register servers connected to the network 105. The application manager may also transmit requests upon commands by a user providing input to the management server 101 through, for example, communications module 290. The application manager may also simultaneously transmit a request to register multiple servers, such as through broadcast or multicast delivery.

After transmitting a request to register one or more application servers, the application manager may determine whether one or more servers have responded to the request. If a response has been received, the application manager 101 may determine whether the server is an internal server or a trusted server at step 310, as disclosed in further detail in the examples below. In addition to determining whether a response has been received, the application manager 101 may determine the type of response received. For example, the application manager 101 may proceed to step 310 when a responding server transmits a response indicating desire to be identified for registration.

Before determining whether the application server is an internal server or a trusted server at step 310, the application manager 101 may also determine whether a requesting or responding application server contains data (e.g. applications) that may be used and/or provided by the application manager. For example, the application manager 101 may attempt to determine whether an application server is an internal server or a trusted server for servers that store or manage applications that may be provided by the application manager to one or more devices. Applications that may be provided include, but are not limited to, applications in platforms supported by the application manager and/or devices or platforms that are in a format that may be converted to a format supported by the application manager and/or devices. The application manager 101 may also attempt to determine whether a server is an internal server or a trusted server for servers that store other management applications that manage servers containing applications that may be provided by the application manager 101.

Further in step 305, the application manager 101 may identify an application server by, for example, setting a flag for the server, indicating that the server requires registration as trusted in, for example, step 315 or untrusted in, for example, step 320, as disclosed in further detail in the examples below. Instead of setting a flag, the application manager 101 may, for example, keep open one or more lines of communication with a server requiring registration and close one or more lines of communication with a server not requiring registration.

In step 310, the application manager may determine whether an identified application server is an internal server (e.g. one of servers 102a-n) or a trusted external server. A server may be determined to be an internal server based on any number of factors previously discussed. In certain embodiments, an internal server may automatically be determined as a trusted server and registered at step 315. However, this need not be the case. For example, an internal server may have to pass additional requirements prior to the application manager 101 identifying the internal server as a trusted server, including any of the factors listed below with respect to determining whether to trust an external server.

If an identified application server is an external server, the application manager 101 may determine whether to trust the server. The external application server may store or manage applications that may be provided by the application manager. The application manager may trust an external server based on one or more factors. For example, the application manager 101 may trust a server that it has previously trusted. An application server may have previously been trusted by the application manager 101 or a third party entity or application. In another embodiment, the application manager 101 may trust a server listed on a predetermined list of trusted servers. For example, an administrator of the application manager 101 may input a list of trusted application servers through the communications module 290. The list of trusted application servers need not be inputted through the communications module and can be obtained and/or populated in any manner. For example, the list may be received by the application manager 101 from one or more trusted servers. The application manager 101 may compare a registered external server with a list of trusted application servers to determine whether the registered server should be trusted.

The application manager may also decide to trust an application server based on various characteristics of the server. For example, the server may be owned, operated, and/or managed by an entity that owns, operates, and/or manages the management server 101. Additionally or alternatively, the server may be used by the entity. Furthermore, the server may store or use applications used by the entity.

The application manager may also request input from one or more administrators or users of the application manager as to the trustworthiness of a registered server. For example, the application manager may cause a display, connected to the management server or any other server or device within the network environment 100, to display a screen indicating one or more application servers available to become trusted servers and an input area for the user or administrator to indicate whether or not to trust the one or more servers. The application manager may receive a message from a user or administrator indicating to trust or not to trust the server. Furthermore, the application manager may transmit to the user or administrator more information on the registered server, in response to a request requesting more information.

An option to override a determination that an application server is trusted or not may also be included. For example, if, at step 310, the application manager 101 determines that a server is trusted, a user or administrator may override the determination (e.g. through an input unit connected to a server or device within network environment 100), causing the server not to be trusted. Similarly, if, at step 310, the application manager 101 determines that a server is untrusted, a user or administrator may override the determination (e.g. through an input unit connected to a server or device within network environment 100), causing the server to be trusted.

In step 315, the application manager 101 may register one or more application servers as trusted. In step 320, the application manager may register one or more application servers as untrusted. Registering a server as trusted or untrusted may include adding the server to a list of trusted or untrusted servers managed by the application manager 101. A list of trusted or untrusted servers may also be managed externally, such as by a different application manager or by a user associated with a service provider. Furthermore, the application manager may perform particular registration actions on trusted and untrusted servers. For example, the application manager 101 may exchange secure authentication credentials with trusted servers, and/or may cause trusted servers to maintain a connection with the network environment 100 while causing untrusted servers to disconnect from the network environment 100. Alternatively, the application manager 101 may disconnect itself from any untrusted servers. Furthermore, the application manager 101 may prevent itself from future connections to servers previously identified as untrusted. As will be discussed further with respect to FIG. 4, the application manager may provide to a device only applications stored at a trusted server or managed by a trusted server.

Instead of, or in addition to, registering one or more servers as trusted or untrusted, the application manager 101 may register one or more applications as trusted or untrusted. In identifying an application as trusted or untrusted, the application manager 101 may perform steps similar to those shown in FIG. 3 and its accompanying description. For example, the application manager 101 may register an application as a trusted application if the application is stored on or managed by an internal server (e.g. one of servers 102a-n). Similar to registering an internal server, an application may have to pass additional requirements prior to the application manager identifying the application stored on an internal server as a trusted application, including any of the factors listed below with respect to registering applications not stored on or managed by an internal server.

If an identified application is stored on or managed by an external server, the application manager 101 may perform a determination whether to trust the application. Factors to determine the trustworthiness of an application may include any of the factors listed with respect to the previous description of step 310. Additionally, the application manager 101 may determine the trustworthiness of an application based on other factors. For example, the application manager 101 may determine that all applications falling within a particular application category are trustworthy. Application categories may include, for example, communications applications (e.g. e-mail clients, IM clients, web browsers, news clients, social network clients, and the like), games, media content applications (e.g. video players, audio players, image viewers, and the like), productivity applications (e.g. word processors, calculators, calendars, spreadsheets, task managers, money transfers, mobile payments, and the like), and location-based applications. For example, the application manager 101 may determine, e.g. at step 310, that communications applications and/or productivity applications should be trusted.

The application manager 101 may also determine the trustworthiness of an application based on the developer of the application. For example, the application manager 101 may determine that all applications developed by a particular trusted application source or developer (e.g. individual, entity, corporation, and the like) are trustworthy. Furthermore, the application manager 101 may determine, for example, that all applications developed by a developer having previously developed one or more trustworthy applications are trustworthy. The application manager 101 may also determine the trustworthiness of an application based on the application distributor.

Figure 4:
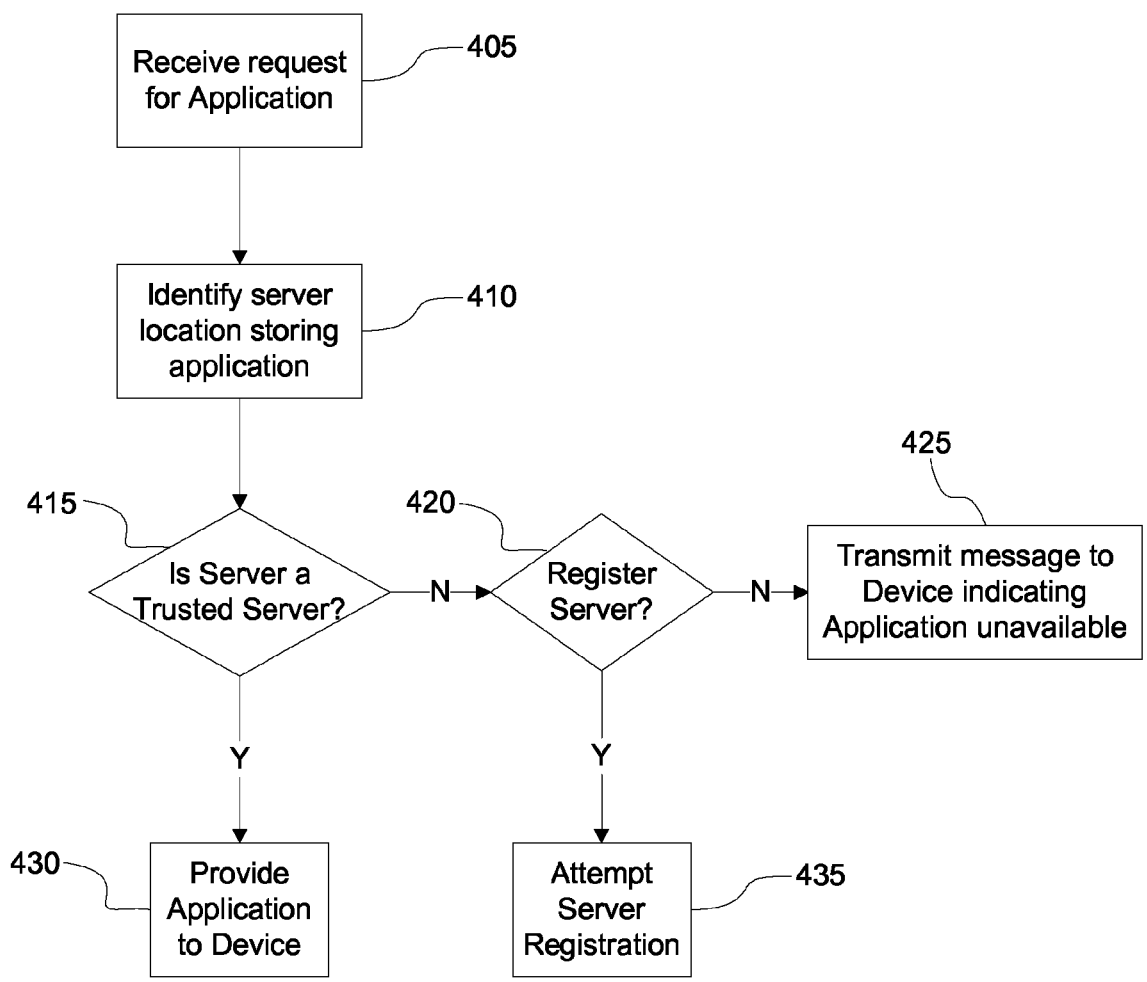
FIG. 4 is a flow diagram illustrating a method of providing an application from a trusted server, according to one or more aspects of the disclosure.

FIG. 4 is a flow diagram illustrating a method of providing an application from a trusted server, according to one or more aspects of the disclosure. In one or more arrangements, any and/or all of the steps of the example methods described herein may be performed by a computing device (e.g., management server 101), performed by a plurality of computing devices operating as a computing system (e.g., network 100), and/or embodied as computer-executable instructions stored on a non-transitory computer-readable medium (e.g., a hard disk, a removable disk, memory 240, and the like). The steps also may be rearranged into other orders, additional steps may be added, and/or one or more steps may be removed.

In step 405, the application manager 101 may receive a request for an application or set of applications from one or more users or devices. For example, as will be described more fully with respect to FIGS. 5 and 6, a user or device may request a set of applications associated with one or more groups of devices or users. In step 410, the application manager 101 may identify one or more application servers (e.g., 102a-n, 103a-n) that store or manage the requested application or set of applications.

In step 415, the application manager 101 may perform a determination whether the one or more servers that store or manage a requested application is a trusted server, determined, for example, in the steps shown in FIG. 3. If the server storing the application is trusted (415:Yes), then in step 430, the application manager 101 may provide the requested application(s) to the requesting device or user. For example, the application manager 101 may cause one or more application servers to directly or indirectly transfer the application to one or more devices. For example, the application manager 101 may transmit the download location of the application to the requesting device or user along with secure credentials so the device/user may perform the download. As another example, the application manager 101 may instruct the server to transfer the application to the management server 101. The management server 101 may then transfer the application to the requesting device or user. The application manager may additionally verify the security of the application prior to transferring the application to the device or user.

Prior to providing the requested application in step 430, the application manager 101 may check for other application entitlements. For example, the application manager 101 may receive from a requesting device and/or user information containing a device's current location. Based on the received location information, the application manager 101 may determine whether the requested application is permitted to be provided to a device currently located at the identified location. The application manager 101 may also determine whether the requested application is permitted to be accessed at that location. If the application is permitted to be provided to or accessed by a device at an indicated location, the application manager 101 may provide the application to a requesting device (e.g. in step 430) or allow a device having the application to access the application from the indicated location. In addition to using location information to determine whether an application may be provided or accessed, the application manager 101 may use location information to determine an appropriate version of the requested application. For example, the application manager 101 may manage multiple versions of a single application, each version corresponding to one or many geographic locations. The application manager 101 may provide, to a requesting device, a version of a requested application corresponding to an indicated location. Examples of locations previously discussed include, but are not limited to, countries, territories and buildings (e.g. buildings used by a particular business entity or service provider).

In step 420, if the application manager 101 has determined that the application server storing a requested application is not a trusted server (415:No), then the application manager 101 may attempt to register the server or application as trustworthy. For example, the application manager 101 may automatically attempt to register an unregistered or untrusted server in step 435 in order to provide a requested application. The application manager 101 may also ask the user or device if the source of the application should be considered trustworthy, and if the application manager 101 receives a response from the device or user to attempt to register the server or application, the application manager may proceed to step 435 to perform the registration process shown in FIG. 3 and previously discussed.

There may be circumstances where the application manager 101 may nevertheless provide an untrusted application, or an application from an untrusted server, to users/devices requesting the application. For example, the application manager 101 may provide an untrusted application with a warning message. As another example, the application manager 101 may provide an untrusted application if the untrusted application is stored or managed by a trusted server. Alternatively, the application manager 101 may provide a trusted application if the application is stored or managed by an untrusted server.

In step 425, if the application manager 101 does not attempt to register an unregistered or untrusted application server storing the requested application (420:No), the application manager 101 may transmit a message to one or more requesting devices or users indicating that the requested application is unavailable. Similarly, if the application manager 101 attempts but fails to register a server or application as trusted through the registration process shown in FIG. 3, the application manager may transmit the message indicated in step 425.

In addition to or instead of performing the steps shown in FIG. 4, the application manager 101 may receive a request from a user or device for a list of available applications. The application manager may provide a list to the user or device. The list may include, for example, applications stored on and/or managed by all trusted servers. The list may also include, for example, all applications, including applications stored on and/or managed by trusted servers and untrusted servers. The list may further indicate available applications (e.g. applications stored on a trusted server) and unavailable applications (e.g. applications stored on an untrusted server). For example, the application manager 101 may, on the transmitted list, distinguish between available and unavailable applications.

Figure 5:
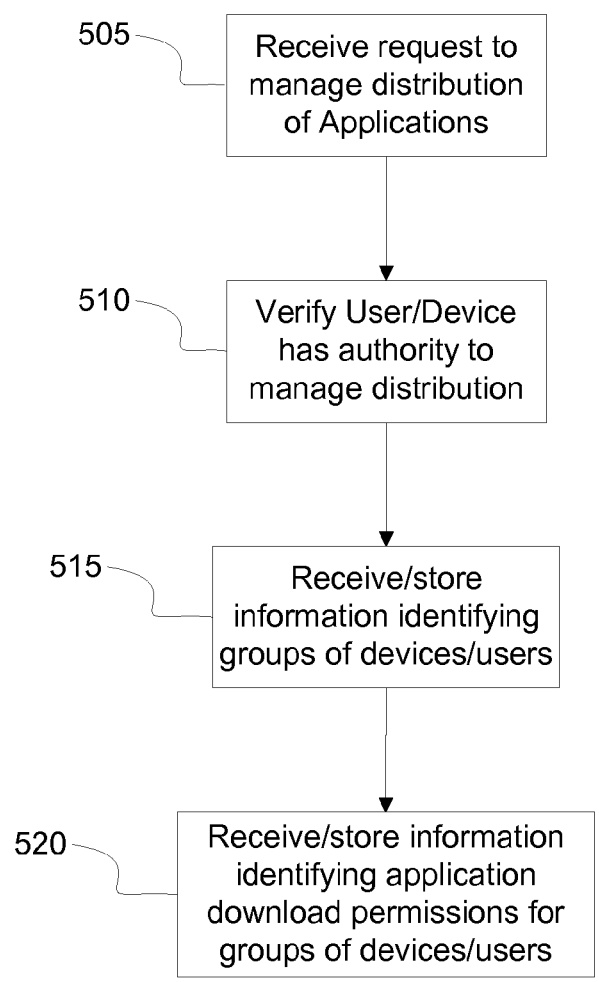
FIG. 5 is a flow diagram illustrating a method of managing groups of devices and applications, according to one or more aspects of the disclosure.

FIG. 5 is a flow diagram illustrating a method of managing groups of devices and applications, according to one or more aspects of the disclosure. In one or more arrangements, any and/or all of the steps of the example methods described herein may be performed by a computing device (e.g., management server 101), performed by a plurality of computing devices operating as a computing system (e.g., network 100), and/or embodied as computer-executable instructions stored on a non-transitory computer-readable medium (e.g., a hard disk, a removable disk, memory 240, and the like). The steps also may be rearranged into other orders, additional steps may be added, and/or one or more steps may be removed.

In step 505, the application manager 101 may receive a request from a user or a device for authority to manage distribution of applications. In step 510, the application manager 101 may verify that a user or device has authority to manage distribution of applications, for example, using a secure system login designated for administrators of the application manager server and/or processes 101. If it is determined that a requesting device or user does not have authority to manage distribution of applications, the application manager 101 may transmit a message to a requesting user or device declining the request. Authority to manage distribution of applications may grant a user or device any number of capabilities. A user or device may manage any of the settings previously described. For example, a user or device may set when and how often to transmit a request to register a server or application, input a list of trusted servers, and override determinations by the application manager 101 of trustworthiness.

Additionally, a user or device may be given authority to identify one or more groups of devices and/or users and to determine a set of applications downloadable by the one or more groups of devices and/or users. In step 515, the application manager 101 may receive, from a user or device having authority, information identifying one or more groups of devices and/or users and store the received information in one or more data structures. Groups of users and/or devices and corresponding download permissions may be grouped in any number of ways. For example, users in a business entity may be grouped by job title, description, level, hierarchy, and/or functional group. For instance, a set of company employees may be grouped by department (e.g., engineering group, marketing group), level or job description (e.g., all employees, first-level managers, contract employees), or the like. In other contexts, such as schools, family, or household context, users may be grouped by age (e.g., children in the house under or over a specific age), grade (e.g., students who are upperclassmen, students who are enrolled in a specific program, major, or the like), or role (students in a specific club or activity), and the like. Users and/or devices may be grouped in these and many other ways, not limited to the aforementioned examples.

In step 520, after identifying a specific user/device, or a group of users/devices, the application manager 101 may receive, information identifying the application download permissions for the one or more users, devices, and groups and may store the received information in one or more data structures. For example, for a group consisting of marketing employees at a business, the group may be designated with permissions to download specific applications including a presentation program, an email client, and a social network client. A group consisting of first-level managers at a company may be designated with permissions to download applications including the same email client, an employee time-validation application, and a task manager application. As another example, a group of students in a school may be designated with permissions to download a social networking client.

The one or more groups may, but need not, be mutually exclusive. One or more devices and/or users may be part of both the first group and the second group and therefore have permission to download applications downloadable by either group. Similarly, the applications downloadable by each group may, but need not, be mutually exclusive. For example, both a first group and a second group may be given permission to download an email client application. As is apparent, the application manager 101 may receive and store information identifying any number of groups.

Figure 6:
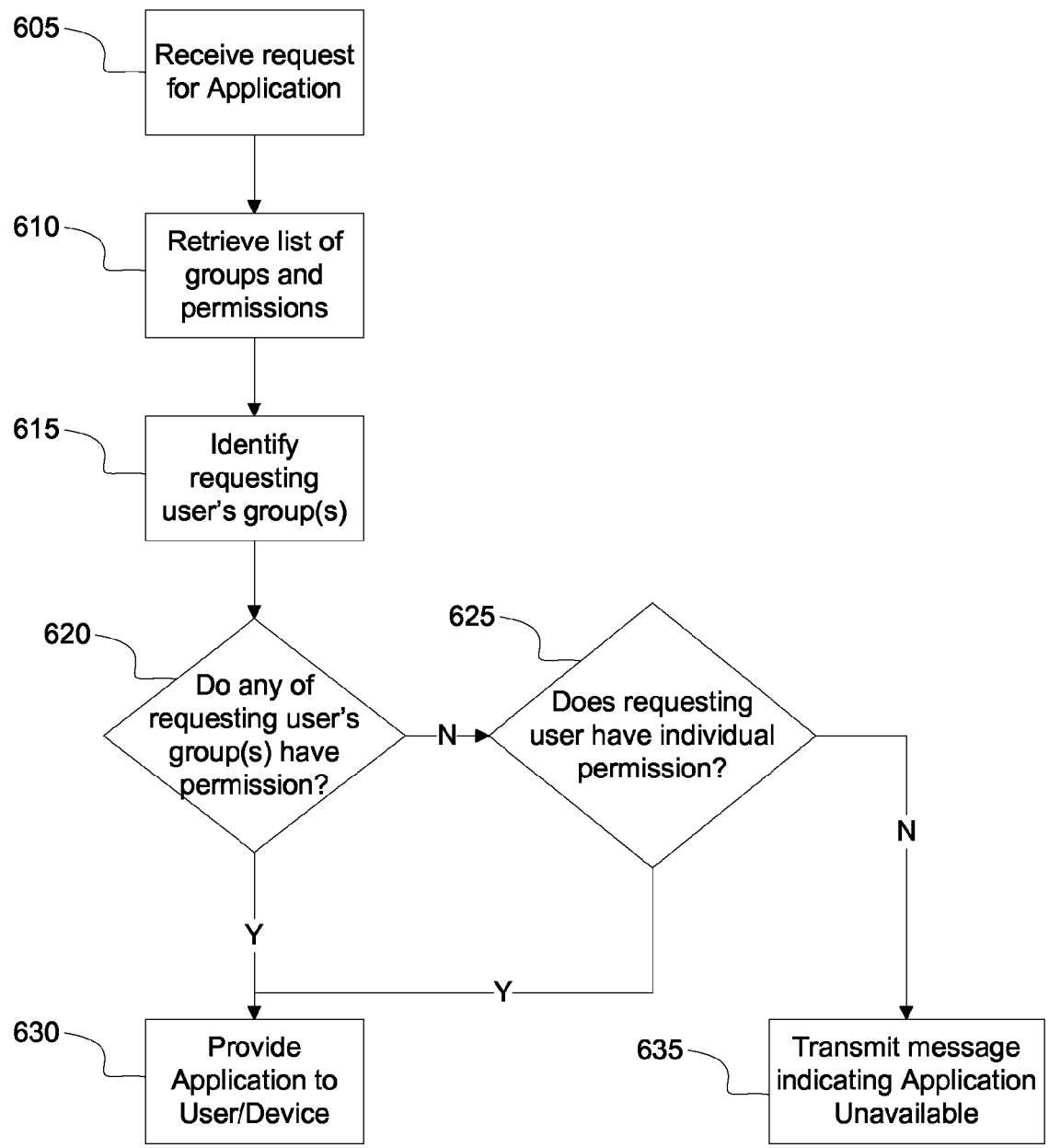
FIG. 6 is a flow diagram illustrating a method of providing an application to users or devices having permission, according to one or more aspects of the disclosure.

FIG. 6 is a flow diagram illustrating a method of providing an application to users or devices having the appropriate permissions, according to one or more aspects of the disclosure. In one or more arrangements, any and/or all of the steps of the example methods described herein may be performed by a computing device (e.g., management server 101), performed by a plurality of computing devices operating as a computing system (e.g., network 100), and/or embodied as computer-executable instructions stored on a non-transitory computer-readable medium (e.g., a hard disk, a removable disk, memory 240, and the like). The steps also may be rearranged into other orders, additional steps may be added, and/or one or more steps may be removed.

In step 605, the application manager 101 may receive a request for an application from one or more users. In step 610, the application manager 101 may retrieve a list of groups and corresponding download permissions. The list of groups and corresponding download permissions may have been created through the process of FIG. 5 previously described.

In step 615, the application manager 101 may identify groups that the requesting user is part of. In step 620, the application manager 101 may determine if the requested application corresponds to at least one of the user's groups. For example, the application manager 101 may determine whether any of the groups that the requesting user is part of has permission to download the requested application. If the user, as a member of a permitted group, has permission to download the application, the application manager 101, in step 630, may provide the requested application to the requesting user.

If at least one of the user's groups does not have permissions to download the requested application (620:No), then in step 625 the application manager 101 may determine whether the requesting user has individual permissions to download the requested application. If the user has individual permission to download the application, the application manager 101, in step 630, may provide the requested application to the requesting user.

If, in step 625, it is determined that the user does not have group or individual permission to download a requested application, the application manager 101 may, in step 635, transmit a message to the requesting user indicating that the requested application is unavailable. Furthermore, the message may include a reason that the application is unavailable, such as "The application is incompatible with your platform" or "You do not have authority to download this application. Please contact your supervisor or IT administrator."

Figure 7:
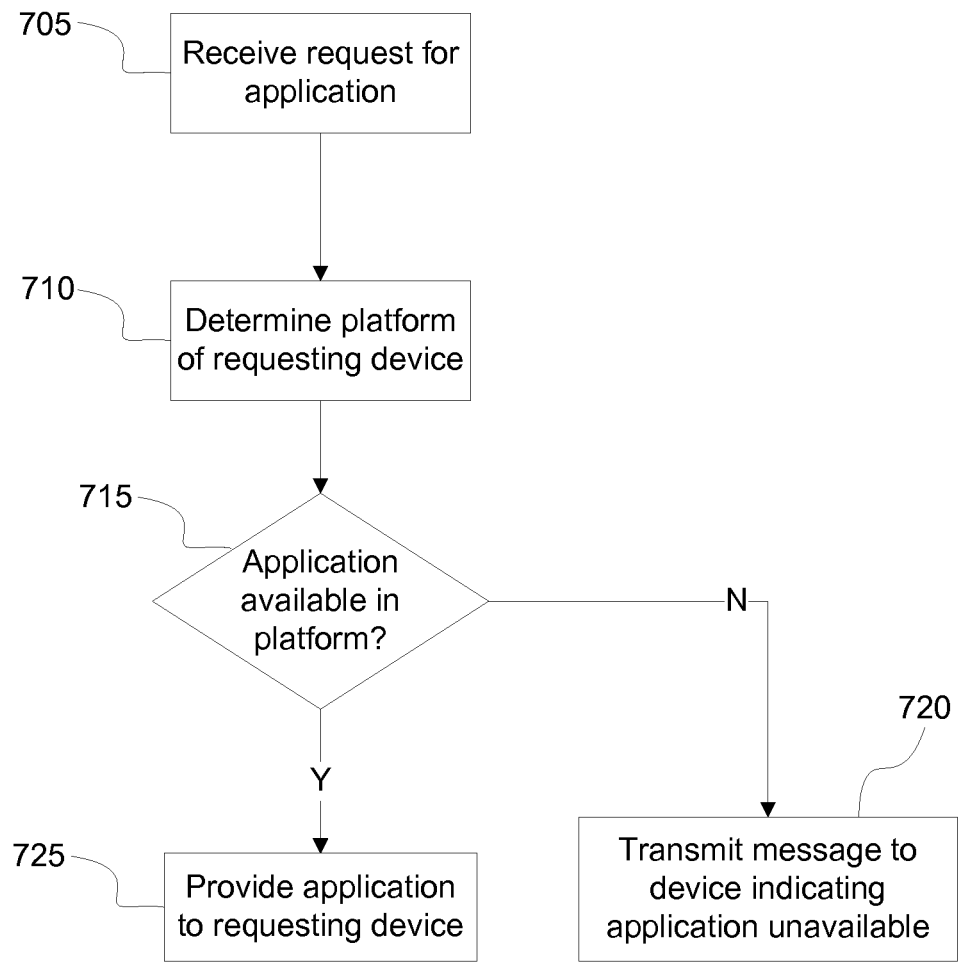
FIG. 7 is a flow diagram illustrating a method of providing an application to a device having a supported platform, according to one or more aspects of the disclosure.

FIG. 7 is a flow diagram illustrating a method of providing an application to a device having a supported platform, according to one or more aspects of the disclosure. In one or more arrangements, any and/or all of the steps of the example methods described herein may be performed by a computing device (e.g., management server 101), performed by a plurality of computing devices operating as a computing system (e.g., network 100), and/or embodied as computer-executable instructions stored on a non-transitory computer-readable medium (e.g., a hard disk, a removable disk, memory 240, and the like). The steps also may be rearranged into other orders, additional steps may be added, and/or one or more steps may be removed.

In step 705, the application manager 101 may receive a request for an application from one or more users or devices in a manner similar to step 405, shown in FIG. 4.

In step 710, the application manager 101 may determine the platform of the requesting device. For example, the application manager 101 may identify the platform of the requesting device based on information in the application request received from the device, such as network packet/protocol headers or the like. The application manager 101 may also transmit a query or request back to the device for the device's platform. Information identifying a platform of the device may have also been received and stored when the requesting device was identified by or registered with the application manager 101. For example, a device may be registered with the application manager 101 the first time the device requests an application from the application manager 101. In the above examples, the application manager 101 may need to authenticate the platform of the requesting device. The application manager 101 may also separately request from the device information identifying its platform by transmitting a message and waiting for a response. The application manager 101 may also periodically poll registered devices for information identifying their respective platforms. Platform information may be stored at the application manager 101 and may be updated periodically, for example, when a device upgrades or changes its platform. Alternatively, the application manager may perform device detection. For example, the application manager may keep track of a device's ID, where an ID may include a serial number, phone number, workstation number, or any other number that uniquely identifies the device.

A platform may refer to a standard around which the computer system of the device may be developed. The platform may depend on the device's underlying hardware, software, or combination of hardware and software. For example, a device's platform may be based on its operating system.

In step 715, the application manager 101 may determine if a platform version of the requested application (e.g., an executable copy of the application that is developed for, compatible with, and/or operable on a specific software operating system and/or device hardware) exists for the platform of the requesting device. The application manager 101 may, for example, determine if the application is available for the platform of the requesting device from one or more servers, e.g. management server 101, internal servers 102a-n and external servers 103a-n. The application manager 101 may also poll other application managers and application sources to determine whether the requested application is available in the platform of the requesting device. If, for example, a requested application is not available in a requested platform, the application manager 101 may determine whether the application may be converted to a format supported by the platform of the requesting device. Furthermore, the application manager 101 may determine whether a prior version of the requested application is available. If the prior version is available, the application manager 101 may determine, in step 715, that the requested application is compatible with the platform of the requesting device.

In step 720, if the application manager 101 determines that the requested application is not available in the platform of the requesting device, the application manager may transmit a message to the requesting device that the application is unavailable. For example, the application manager 101 may indicate that the application is not available in the platform of the requesting device. Additionally, the application manager 101 may provide for the requesting user/device a list of platforms that support the requested application. The application manager 101 may also suggest alternative applications available in the requesting device's platform. In one embodiment, applications registered with and verified as trustworthy by the application manager may be categorized by function. Categorization may occur at the time of registration and verification, but may occur any time before or after that time. For example, the application manager 101 may verify a first word processing application as trustworthy, and may store information categorizing that application as a trusted word processing application in one or more specified platforms. Similar operations may be performed for other word processing applications as they are registered. Then, if a requested word processing application is not available in the platform of the requesting device, the application manager 101 may use the stored data to generate and transmit a list of alternative trusted applications in the same category (e.g. word processing) and which are compatible with the platform of the requesting device.

In step 725, if the application manager 101 determines that the requested application is available in the platform of the requesting device, the application manager may provide the application to the requesting device. The application manager may also suggest additional applications and/or provide available alternative applications as described above.

Figure 8:
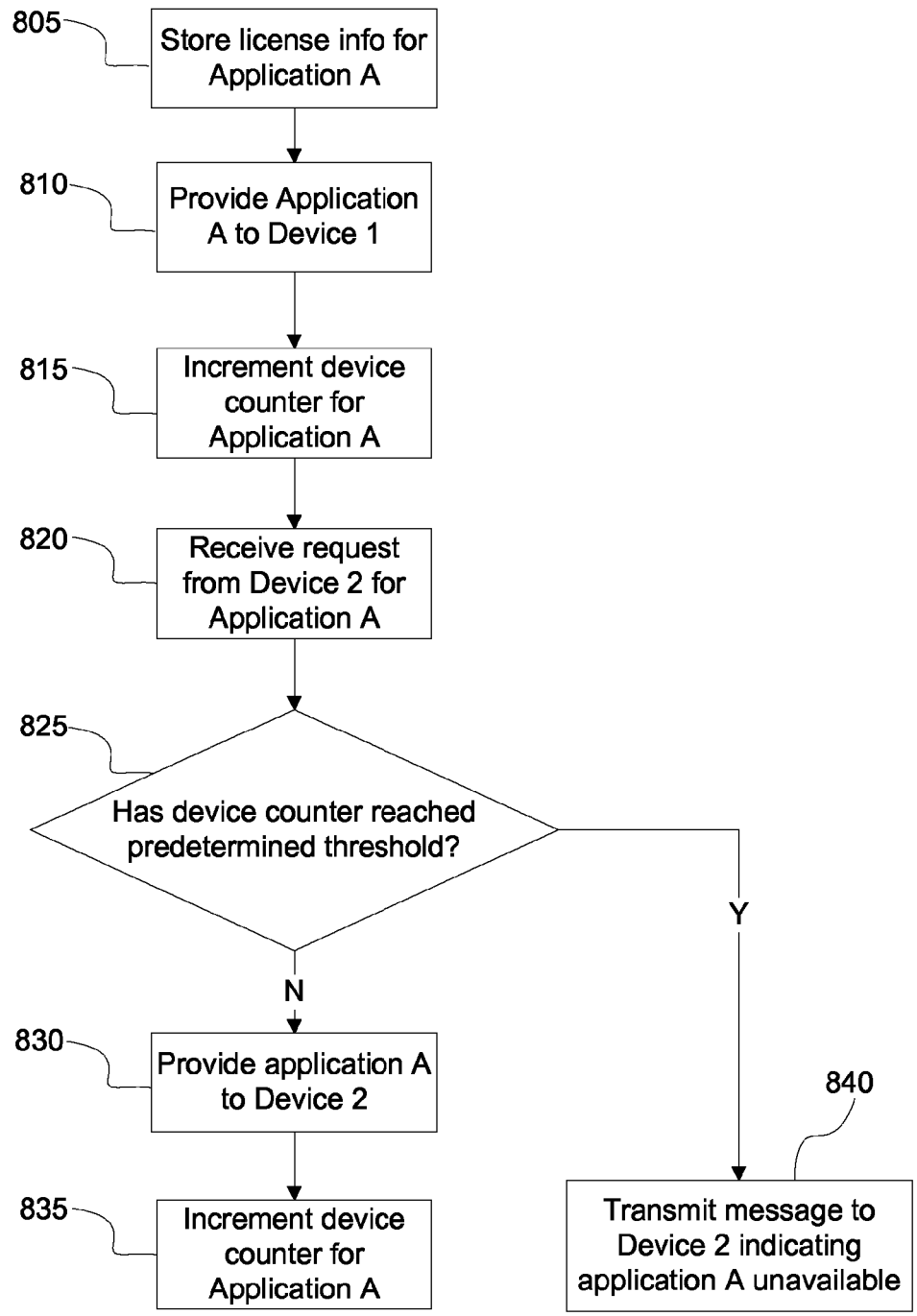
FIG. 8 is a flow diagram illustrating a method of managing licenses for applications and devices, according to one or more aspects of the disclosure.

FIG. 8 is a flow diagram illustrating a method of managing/enforcing licenses for applications and devices, according to one or more aspects of the disclosure. In one or more arrangements, any and/or all of the steps of the example methods described herein may be performed by a computing device (e.g., management server 101), performed by a plurality of computing devices operating as a computing system (e.g., network 100), and/or embodied as computer-executable instructions stored on a non-transitory computer-readable medium (e.g., a hard disk, a removable disk, memory 240, and the like). The steps also may be rearranged into other orders, additional steps may be added, and/or one or more steps may be removed.

In step 805, the application manager 101 may store license information for an application ("application A") requested by a user and/or device. Examples of license information include, but are not limited to, the number of installations allowed, the number of devices that may simultaneously use the application, whether the application may be redistributed. In other examples, application licenses may be unlimited licenses and/or may permit unlimited application downloads, installations, and/or executions. Unlimited licenses may cost more than limited licenses. A license that permits two application downloads may cost $1, whereas a license that permits unlimited application downloads may cost $5. Alternatively, an unlimited license may include an upfront fee, e.g. $2, for the first download and additional fees for each subsequent download, e.g. $1.

Other examples of license information include, but are not limited to, limitations on downloads and access based on geographic locations of users and/or devices. For example, a license for an application may limit use of the application to a particular geographic location (e.g. by country, region, or premises). The application manager 101 may receive, from an end-user device, information containing the device's current location. The application manager 101 may compare a device's current location to a list of permitted locations. Permitted locations may be, for example, indicated in license information for one or more applications received at and/or managed by the application manager. If a device's current location is on a list of permitted locations, the application manager may permit the device to download or access a requested application. Instead of a location-based license (e.g. regional license), a license may be a worldwide license that allows a user and/or device to use or download an application from anywhere in the world. Furthermore, instead of a device providing its current location to an application manager, the device may provide its expected location, such as a home base. For example, a user may have his or her home base in the United States, but currently be located in India. A device used by the user may transmit its expected location (e.g. home base of the United States) to the application manager 101, instead of or in addition to its current location. If a license for an application identifies that the application may be used and/or downloaded by a device having a home base of the United States, for example, the application manager 101 may permit the device to use and/or download the application.

In steps 810-840, the application manager 101 may enforce the terms of the stored license by implementing a device counter for an application whose license terms are limited to a predetermined number of devices. In step 810, the application manager 101 may provide application A to a first device. The application manager 101 may provide the application in response to any of the previously described methods. For example, the application manager 101 may provide application A to a first device in response to determining that application A is supported by the platform of the first device, similar to the process shown in FIG. 7. The application manager 101 may provide the application in a similar manner as the methods shown in FIG. 4 and FIG. 6, or any other method that results in the application manager 101 providing one or more applications to one or more devices. In addition to providing one or more applications to a device, the application manager 101 may store identification for the device. Identification includes, but is not limited to, a device name, identification of a user associated with the device, a telephone number or any unique identifier, such as a series of alphanumeric characters, located physically (e.g. printed) on the device or in a device memory.

In step 815, the application manager 101 may increment the count of a device counter for application A. The application manager 101 may use the device counter to determine the number of times an application has been installed and/or the number of devices simultaneously using the application. Similarly, the application manager 101 may decrement the count of a device counter if application A has been stopped and/or uninstalled by a device, depending on the license terms for application A.

In step 820, the application manager 101 may receive a request from a second device for application A. The application manager 101 may respond to a request from a second device for application A based on the license information stored at step 805 and a current count of a device counter. Several examples of license management will now be provided.

In certain embodiments, the first and second devices may be in operation at the same time. Assuming that application A has been installed on the first device (e.g. provided at step 810), the application manager 101, in step 825, may determine, from the license information stored at step 805 and current count of the device counter, whether application A may be installed on the second device. For example, the application manager, in step 825, may determine whether the current count of the device counter has reached a predetermined threshold. The predetermined threshold may be determined from the license information stored at step 805. For example, if a license indicates that an application may be installed on only one device, the application manager may set the predetermined threshold at 1.

In step 840, if the current count of a device counter has reached a predetermined threshold, the application manager 101 may transmit a message to the second device indicating that application A is unavailable. The application manager may additionally include in the message information that the license does not permit installation of the application on more than one device and information identifying the first device. Furthermore, the message may include a link to, for example, a website where a new license may be purchased.

In step 830, if a current count has not reached a predetermined threshold, the application manager may provide application A to the second device. In addition to providing application A to the second device, the application manager 101 may store identification for the second device. Identification includes, but is not limited to, a device name, identification of a user associated with the device, a telephone number or any unique identifier, such as a series of alphanumeric characters, located physically (e.g. printed) on the device or in a device memory. In step 835, the application manager 101 may increment the device counter for application A.

In another example, the first and second devices may again be in operation at the same time. However, instead of or in addition to determining the number of times application A may be installed, the application manager 101 may determine the number of devices that may simultaneously run application A. In this example, the application manager 101 may permit multiple devices (or even an unlimited number) to download and install the application. When the first device uses the application, the application manager 101 may receive a message from the first device that indicates that the first device is using the application. Additionally, the application manager 101 may store identification for the first device (e.g. device name, user ID, telephone number or other unique identifier). The application manager 101 may then, for example, increment a count of the device counter. When the first device is finished using the application (e.g. a user of the first device closes out of the application), the application manager 101 may receive a message from the first device indicating that the first device is finished using the application, and the application manager may subsequently decrement a count of the device counter. Optionally, the application manager 101 may also remove identification for the first device from storage.

Each time a device attempts to use or access the application, the application manager 101 may receive an inquiry from the device requesting permission to use the application. The application manager 101 may check if the count has reached a predetermined threshold. If the count has reached a predetermined threshold, the application manager 101 may transmit, in step 840, a message to the requesting device that use of the application is unavailable because it is currently being used by another device. The message may also indicate information identifying the other device or user currently using the application, the information having previously been stored by the application manager. Alternatively, the application manager 101 could grant limited access to the requesting device. Limited access may be, for example, ability to view windows or documents in the application, but not ability to alter the windows or documents. If the count has not reached a predetermined threshold, as determined in step 825, the application manager 101 may permit the requesting device to use the requested application (e.g. step 830). Subsequently, the application manager 101 may increment a count of the device counter (e.g. step 835).

In other embodiments, the application manager may not need to determine if the first and second devices are executing the application at the same time. For example, a user may have used a first device in the past but has since decided to switch to a second device and deactivated the first device. In this example, the application manager 101 may receive a message from the first device when the user decides to deactivate the first device. Alternative means may be used to determine that a device is no longer in use. Once the application manager 101 verifies that a first device is no longer in use, the application manager may release the application license to another device or user (e.g. decrement a count of a device counter). For example, if the user switches to a second device, the user may use the released application license to install and run application A on the second device.

Furthermore, the application manager 101 may manage the application licenses for the first and second devices. For example, the application manager 101 may store application product keys for the application. The application manager 101 may further provide the product key to the devices.

Figure 9:
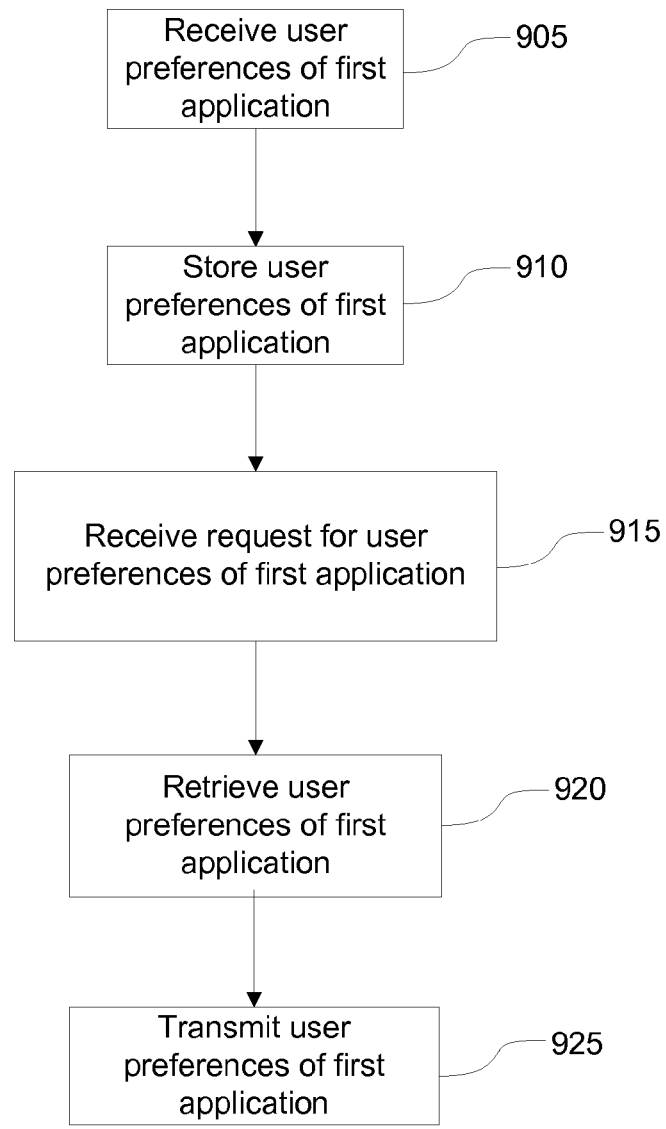
FIG. 9 is a flow diagram illustrating a method of managing user preferences for applications and devices, according to one or more aspects of the disclosure.

FIG. 9 is a flow diagram illustrating a method of managing user preferences for applications and devices, according to one or more aspects of the disclosure. In one or more arrangements, any and/or all of the steps of the example methods described herein may be performed by a computing device (e.g., management server 101), performed by a plurality of computing devices operating as a computing system (e.g., network 100), and/or embodied as computer-executable instructions stored on a non-transitory computer-readable medium (e.g., a hard disk, a removable disk, memory 240, and the like). The steps also may be rearranged into other orders, additional steps may be added, and/or one or more steps may be removed.

In step 905, the application manager 101 may receive a set of user preferences for a first application installed on one or more devices and may store the preferences in one or more data storage locations in step 910. Application user preferences may include many different types of data, for example, configuration settings, login credentials, user customization data, and other types of user information related to an application. User preferences may determine the appearance of a graphical user interface of the application, by storing information corresponding to a background wallpaper, screen resolution, and the preferred user options, menu items, and the like that will be displayed when a user interacts with the application. As another example, in a web browser application, user preferences may store information on bookmarked or most commonly visited websites, along with cookies storing the user's selections in past visits to those sites and/or the user's login credentials at those web sites. Application user preferences may include any number of other preferences that allow a user to customize the application.

In step 915, the application manager 101 may receive a request from a second application for user preferences of the first application. In certain examples, the second application may be running on the same device. For instance, the first and second applications may be two different mobile web browsers, and the user preferences may include a list of bookmarked webpages. In this example, the second application may request information on bookmarked webpages used by the first application. Alternatively, the first and second applications may be running on different devices associated with the same user or group of users. For example, the first and second applications may be the same application running on two different devices associated with the same user. The platform of the two devices may, but need not, be the same. For example, the first application may be a consumer application configured to run on a laptop notebook operating system, and the second application may be the same consumer application configured to run on a mobile device platform. The user may be able to synchronize his or her user application preferences on the different devices.

In step 920, the application manager 101 may retrieve user preferences of the first application. For example, the application manager 101 may retrieve user preferences stored in a data structure. Alternatively, the user preferences may be retrieved, for example, by requesting them from the first application (e.g. if user preferences of the first application were not received in step 905). If the application manager 101 is unable to retrieve user preferences, the application manager may transmit a message to the second application that the requested user preferences are unavailable. Additionally, the application manager 101 may suggest storage of user preferences by the second application.

In step 925, the application manager 101 may transmit user preferences for the first application to the second application.

Figure 10:
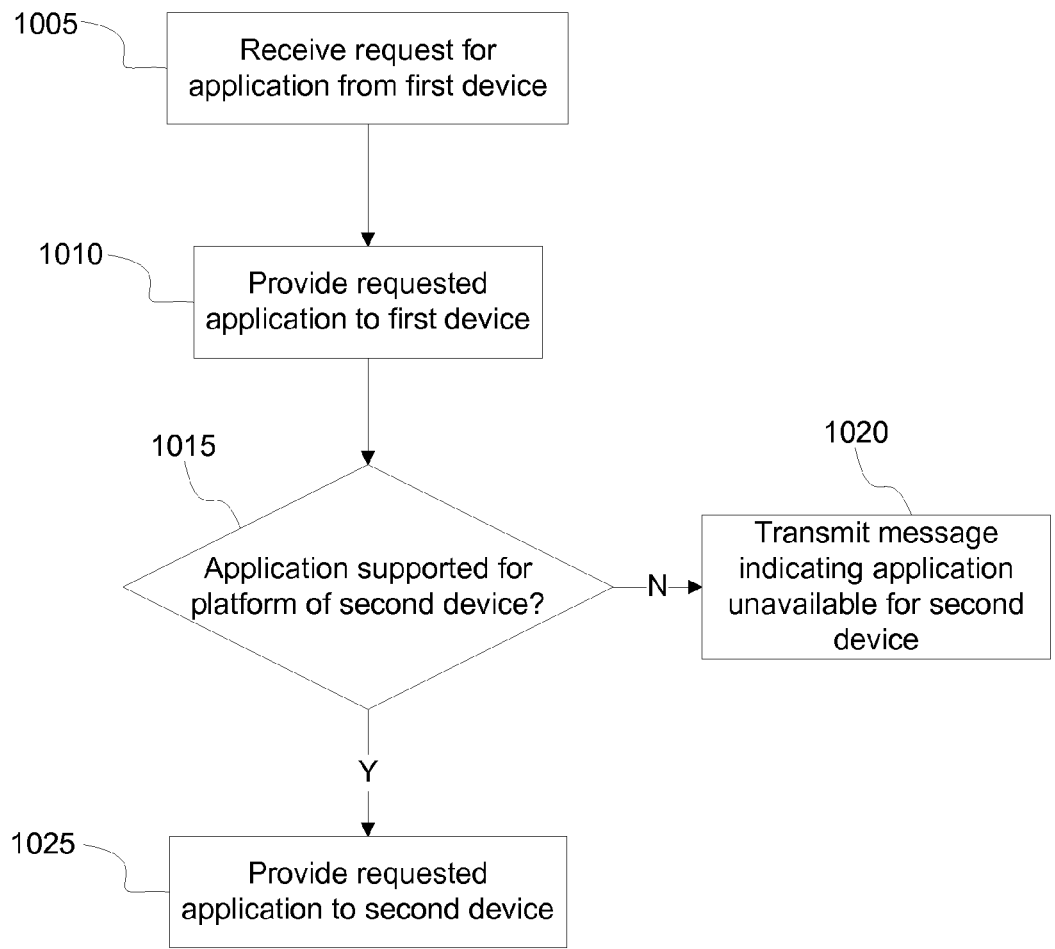
FIG. 10 is a flow diagram illustrating a method of transmitting an application to multiple devices based on a request from a single device, according to one or more aspects of the disclosure.

FIG. 10 is a flow diagram illustrating a method of transmitting an application to multiple devices based on a request from a single device, according to one or more aspects of the disclosure. In one or more arrangements, any and/or all of the steps of the example methods described herein may be performed by a computing device (e.g., management server 101), performed by a plurality of computing devices operating as a computing system (e.g., network 100), and/or embodied as computer-executable instructions stored on a non-transitory computer-readable medium (e.g., a hard disk, a removable disk, memory 240, and the like). The steps also may be rearranged into other orders, additional steps may be added, and/or one or more steps may be removed.

In step 1005, the application manager 101 may receive a request for an application from a first device. When a request is received, the application manager, in step 1010, may provide the requested application to the first device.

In step 1015, the application manager 101 may determine whether the application is available on the platform of a second device associated with the first device. The first and second devices may be associated in any number of ways. For example, the first and second devices may be owned, managed and/or used by the same user. The first and second devices may also be associated as part of the same user or device group, as was described with respect to FIGS. 5 and 6. The first and second devices may be associated in any other way within the scope of the invention.

In step 1020, if the application is not available on the platform of the second device, the application manager 101 may transmit a message to the second device and/or first device indicating that the application is unavailable for the second device. Additionally, the message may indicate the reason that the application is unavailable, e.g. that the application is not supported by the platform of the second device.

In step 1025, if the application is available on the platform of the second device, the application manager 101 may provide the application to the second device. In certain examples, the application may be automatically provided to the second device as a way of seamlessly synchronizing the applications on a user's devices, while in other examples the application manager 101 may ask for permission to provide the requested application to the second device. For example, the application manager 101 may transmit a message to the second device and/or first device indicating that the application is available for the second device and may request a response from the second device and/or first device to determine whether to provide the application to the second device. If the second device and/or first device respond(s) in the affirmative, the application manager 101 may then provide the requested application to the second device.

Alternatively, the application manager need not receive a request for an application from a first device (e.g. step 1005) and may provide the application to the first and second devices based on another command. For example, the application manager 101 may receive a command inputted through a communications module 290 requesting that the application manager transmit the application to the first and second devices.

The method steps of FIG. 10 are not limited to two devices and may be performed for any number of devices. For example, a single user may use or own four devices, such as a tablet computer, a laptop computer, a desktop computer and a smartphone. If the user requests, through the desktop computer, a web browser application, the application manager 101 may provide the web browser application to the desktop. The application manager 101 may also transmit a message to one, some or all of the four devices owned by the user asking the devices whether to provide the application to one, some or all of the three remaining devices (i.e. laptop computer, tablet computer and smartphone). If, for example, one, some or all of the remaining devices respond in the affirmative, the application manager may provide the web browser application to the laptop computer, tablet computer and/or smartphone, in addition to the desktop computer.

Figure 11:
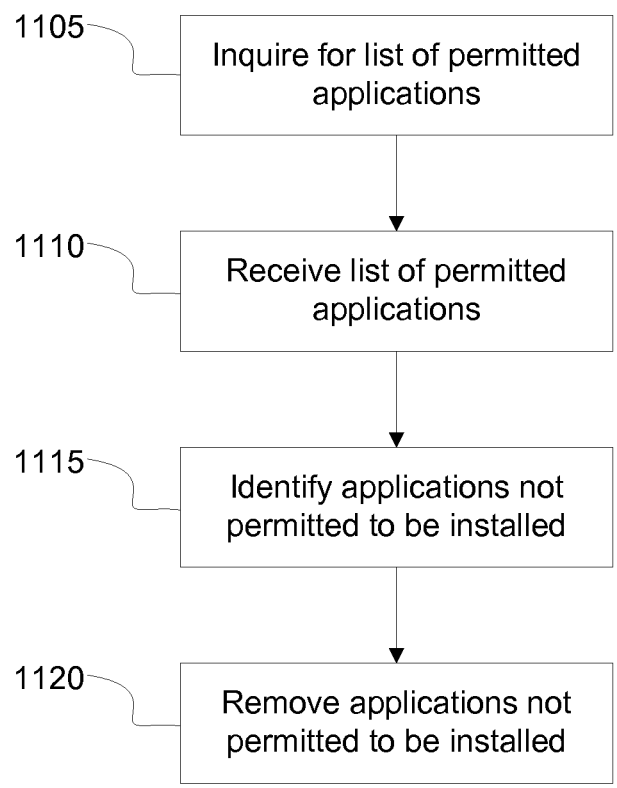
FIG. 11 is a flow diagram illustrating a method of removing and/or preventing access to an application, according to one or more aspects of the disclosure.

FIG. 11 is a flow diagram illustrating a method of removing and/or preventing access to an application, according to one or more aspects of the disclosure. In one or more arrangements, any and/or all of the steps of the example methods described herein may be performed by a computing device (e.g., management server 101), performed by a plurality of computing devices operating as a computing system (e.g., network 100), and/or embodied as computer-executable instructions stored on a non-transitory computer-readable medium (e.g., a hard disk, a removable disk, memory 240, and the like). The steps also may be rearranged into other orders, additional steps may be added, and/or one or more steps may be removed.

In step 1105, a device may inquire, from the application manager 101, for a list of applications permitted to be installed on the device. Furthermore, the device may periodically inquire for a list of permitted applications (e.g. hourly, daily, weekly, and the like). In step 1110, a device may receive, from the application manager 101, a requested list of permitted applications for the device. The requested list may include all applications permitted to be installed on the device. Alternatively, the requested list may include only those applications permitted to be installed on the device and also managed by the application manager 101. For example, applications managed by another application manager might not be included on the list received by the device.

A list of permissions may result from any of the embodiments previously described. For example, a list of permissions may be generated after the application manager 101 registers an application server as trusted (e.g. step 315) or untrusted (e.g. step 320). The application manager 101 may include, on a list of permitted applications, all applications stored on or managed by a trusted application server. Conversely, the application manager 101 may exclude, from a list of permitted applications, all applications stored on or managed by an untrusted server. Similarly, the application manager 101 may exclude all applications stored on or managed by a server that has not gone through registration by the application manager. A list of permissions may also be generated after the application manager 101 registers individual applications as trusted or untrusted.

A list of permitted applications may also be generated for each group of devices and/or users having corresponding download permissions. As previously described, business entity groups may be generated based on job title, department, description, level, hierarchy, and/or functional group. In other contexts, such as schools, family, or household context, users may be grouped by age (e.g., children in the house under or over a specific age), grade (e.g., students who are upperclassmen, students who are enrolled in a specific program, major, or the like), or role (students in a specific club or activity, and the like). The application manager 101 may manage a list of permitted applications for each identified group.

In step 1115, a device may compare a list of permitted applications to a list of applications currently installed on the device. In comparing a list of applications installed on a device to a list of permitted applications for the device, a device may identify applications on the list of applications installed on the device not present on the list of permitted applications. In this example, the identified applications may not be permitted to be installed on the device.

In step 1120, a device may remove applications not permitted to be installed on the device. Removal may include, for example, uninstalling an application or preventing use of and/or access to an application. Inquiring for a list of permitted applications, receiving a list of permitted applications, identifying applications not permitted to be installed, and removing applications not permitted to be installed on the device may be performed by an on-device application associated with the application manager 101. The on-device application may be pre-installed on one or more devices. For example, the on-device application may be installed on devices provided to users by one or more business entities or service providers. Alternatively, a device may be required to download and install an on-device application. For example, the application manager 101 may provide an on-device application when the application manager provides a requested application to the device. An on-device application may also be used as a portal to transmit, to the application manager 101, information regarding applications installed and/or used by a device. For example, the on-device application may transmit a list of applications installed on a device. The on-device application may also transmit a list of applications removed from the device (e.g. in removal step 1120). The list may be transmitted to the application manager 101 periodically (e.g. hourly, daily, weekly, and the like).

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. An apparatus, comprising:
    at least one processor; and
    memory storing computer-readable instructions that, when executed by the at least one processor, cause the apparatus to:
        receive a request to provide a first application to a first device;
        determine a first platform of the first device, wherein determining the first platform comprises identifying a first operating system of the first device;
        identify a first platform version of the first application, wherein the first platform version of the first application corresponds to a version of the first application that is operable on the identified first operating system of the first device, wherein identifying the first platform version of the first application comprises:
            determining that the first application is not available for the first operating system of the first device;
            determining that an available prior version of the first application is compatible with the first operating system of the first device; and
            identifying the available prior version as the first platform version of the first application;
        determine a first application server associated with the first platform version of the first application;
        compare an identifier of the first application server to a list of trusted server identifiers;
        determine, based on the comparison, that the first application server is a trusted application server; and
        provide the first platform version of the first application to the first device based on the determination that the first application server is trusted.

2. The apparatus of claim 1, wherein determining that the first application server is a trusted application server comprises:
    determining that the identifier of the first application server is not present in the list of trusted server identifiers;
    determining that the first application server is an internal server; and
    storing information identifying the first application server in the list of trusted server identifiers, based on the determination that the first application server is an internal server.

3. The apparatus of claim 1, wherein determining that the first application server is a trusted application server comprises:
    determining that the identifier of the first application server is not present in the list of trusted server identifiers;
    determining that the first application server is a trusted external server; and
    storing information identifying the first application server in the list of trusted server identifiers, based on the determination that the first application server is a trusted external server.

4. The apparatus of claim 1, wherein the computer-readable instructions that, when executed by the at least one processor, further cause the apparatus to:
    receive a second request to provide the first application to a second device;
    determine a second platform of the second device, wherein determining the second platform comprises identifying hardware of the second device, software of the second device, or a combination of hardware and software of the second device;
    determine that the second platform of the second device is different from the first platform;
    identify a second platform version of the first application, wherein the second platform version of the first application corresponds to a version of the first application that is operable on the identified hardware, identified software, or identified combination of hardware and software of the second device; and
    provide the second platform version of the first application to the second device.

5. The apparatus of claim 1, wherein the first device is a member of a first device group and the computer-readable instructions that, when executed by the at least one processor, further cause the apparatus to:
    store information identifying the first device group;
    store information identifying a second device group, the second device group being different from the first device group;
    store a first permission for the first device group, wherein the first permission allows devices within the first device group to be provided the first application; and
    store a second permission for the second device group, wherein the second permission does not allow devices within the second device group to be provided the first application.

6. A method, comprising:
    receiving, at an application manager, a request to provide a first application to a first device;
    determining, by the application manager, a first platform of the first device, wherein determining the first platform comprises identifying a first operating system of the first device;

identifying, by the application manager, a first platform version of the first application, wherein the first platform version first application corresponds to a version of the first application that is operable on the identified first operating system of the first device, wherein identifying the first platform version of the first application comprises:
  determining that the first application is not available for the first operating system of the first device;
  determining that an available prior version of the first application is compatible with the first operating system of the first device; and
  identifying the available prior version as the first platform version of the first application;
determining, by the application manager, a first application server associated with the first platform version of the first application;
comparing, by the application manager, an identifier of the first application server to a list of trusted server identifiers;
determining, by the application manager, based on the comparison, that the first application server is a trusted application server; and
providing, by the application manager, the first platform version of the first application to the first device based on the determination that the first application server is trusted.

7. The method of claim 6, wherein determining that the first application server is a trusted application server comprises:
  determining that the identifier of the first application server is not present in the list of trusted server identifiers;
  determining that the first application server is an internal server; and
  storing, by the application manager, information identifying the first application server in the list of trusted server identifiers, based on the determination that the first application server is an internal server.

8. The method of claim 6, wherein determining that the first application server is a trusted application server comprises:
  determining that the identifier of the first application server is not present in the list of trusted server identifiers;
  determining that the first application server is a trusted external server; and
  storing, by the application manager, information identifying the first application server in the list of trusted server identifiers, based on the determination that the first application server is a trusted external server.

9. The method of claim 8, wherein the first application server comprises at least one of a previously trusted server, a server listed on a predetermined list of trusted servers, a server managed by an entity that manages the application manager, or a server indicated as trusted by an administrator associated with the application manager.

10. The method of claim 6, further comprising:
  receiving, at the application manager, a second request for the first application associated with a second device;
  determining a second platform of the second device, wherein determining the second platform comprises identifying hardware of the second device, software of the second device, or a combination of hardware and software of the second device;
  determining that the second platform of the second device is different from the first platform;
  identifying a second platform version of the first application, wherein the second platform version of the first application corresponds to a version of the first application that is operable on the identified hardware, identified software, or identified combination of hardware and software of the second device; and
  providing the second platform version of the first application to the second device.

11. The method of claim 6, further comprising:
  in response to receiving the request to provide the first application to the first device, identifying a second device associated with the first device;
  determining a second platform of the second device, wherein determining the second platform comprises identifying hardware of the second device, software of the second device, or a combination of hardware and software of the second device, and wherein the second platform is different from the first platform;
  identifying a second platform version of the first application, wherein the second platform version of the first application corresponds to a version of the first application that is operable on the identified hardware, identified software, or identified combination of hardware and software of the second device; and
  providing the second platform version of the first application to the second device, in response to receiving the request to provide the first application to the first device.

12. The method of claim 6, further comprising:
  receiving, from the first device, a first set of user preferences for the first application;
  determining that the first device and a second device are associated with a first user; and
  transmitting the first set of user preferences to the second device.

13. The method of claim 6, further comprising:
  storing license information for the first application;
  determining, based on the stored license information, that the first application is permitted to be installed on more than one device;
  receiving a request to provide the first application to a second device;
  determining that the second device is associated with the first device; and
  providing the first application to the second device based on the determinations that the first application is permitted to be installed on more than one device and that the second device is associated with the first device.

14. The method of claim 6, wherein the first device is a member of a first device group, the method further comprising:
  storing information identifying the first device group;
  storing information identifying a second device group, the second device group being different from the first device group;
  storing, by the application manager, a first permission for the first device group, wherein the first permission allows devices within the first device group to be provided the first application; and
  storing, by the application manager, a second permission for the second device group, wherein the second permission does not allow devices within the second device group to be provided the first application.

15. A non-transitory computer-readable medium having computer-executable instructions stored thereon that, when executed, cause at least one computing device to:
  receive a request to provide a first application to a first device;
  determine a first platform of the first device, wherein determining the first platform comprises identifying a first operating system of the first device;

identify a first platform version of the first application, wherein the first platform version of the first application corresponds to a version of the first application that is operable on the identified first operating system of the first device, wherein identifying the first platform version of the first application comprises:
  determining that the first application is not available for the first operating system of the first device;
  determining that an available prior version of the first application is compatible with the first operating system of the first device; and
  identifying the available prior version as the first platform version of the first application;
determine a first application server associated with the first platform version of the first application;
compare an identifier of the first application server to a list of trusted server identifiers;
determine, based on the comparison, that the first application server is a trusted application server; and
provide the first platform version of the first application to the first device based on the determination that the first application server is trusted.

16. The non-transitory computer-readable medium of claim 15, having further computer-executable instructions stored thereon that, when executed, cause at least one computing device to:
  receive a second request to provide the first application to a second device;
  determine a second platform of the second device, wherein determining the second platform comprises identifying hardware of the second device, software of the second device, or a combination of hardware and software of the second device;
  determine that the second platform of the second device is different from the first platform;
  identify a second platform version of the first application, wherein the second platform version of the first application corresponds to a version of the first application that is operable on the identified hardware, identified software, or identified combination of hardware and software of the second device; and
  provide the second platform version of the first application to the second device.

17. The non-transitory computer-readable medium of claim 15, having further computer-executable instructions stored thereon that, when executed, cause at least one computing device to:
  store information identifying a first device group, wherein the first device is a member of the first device group;
  store information identifying a second device group, the second device group being different from the first device group;
  store a first permission for the first device group, wherein the first permission allows devices within the first device group to be provided the first application; and
  store a second permission for the second device group, wherein the second permission does not allow devices within the second device group to be provided the first application.

18. The apparatus of claim 1, wherein the computer-readable instructions that, when executed by the at least one processor, further cause the apparatus to:
  in response to receiving the request to provide the first application to the first device, identify a second device associated with the first device;
  determine a second platform of the second device, wherein determining the second platform comprises identifying hardware of the second device, software of the second device, or a combination of hardware and software of the second device, and wherein the second platform is different from the first platform;
  identify a second platform version of the first application, wherein the second platform version of the first application corresponds to a version of the first application that is operable on the identified hardware, identified software, or identified combination of hardware and software of the second device; and
  provide the second platform version of the first application to the second device, in response to receiving the request to provide the first application to the first device.

19. The apparatus of claim 1, wherein the computer-readable instructions that, when executed by the at least one processor, further cause the apparatus to:
  receive, from the first device, a first set of user preferences for the first application;
  determine that the first device and a second device are associated with a first user; and
  transmit the first set of user preferences to the second device.

20. The apparatus of claim 1, wherein the computer-readable instructions that, when executed by the at least one processor, further cause the apparatus to:
  store license information for the first application;
  determine, based on the stored license information, that the first application is permitted to be installed on more than one device;
  receive a request to provide the first application to a second device;
  determine that the second device is associated with the first device; and
  provide the first application to the second device based on the determinations that the first application is permitted to be installed on more than one device and that the second device is associated with the first device.

* * * * *